May 24, 1960     E. F. FISHER     2,937,802
VACUUM PRODUCING AND CONVEYING MEANS
Filed Sept. 19, 1955

INVENTOR
ERNEST F. FISHER

2,937,802
VACUUM PRODUCING AND CONVEYING MEANS

Ernest F. Fisher, 526 Roosevelt Ave., York, Pa.

Filed Sept. 19, 1955, Ser. No. 534,980

5 Claims. (Cl. 230—95)

This invention relates to improvement in means for producing a vacuum and propelling force adapted to the safe handling of radio-active dust particles and other dusts as well as the handling of heavier and bulkier particles, as described in my copending application, Ser. No. 518,899 of June 29, 1955, now abandoned.

One object of the invention is to provide an aspirator tube that will adapt itself to various particle sizes of dust and other particles that pass through the vacuum producer.

Another object is to provide a tube that simulates the act of deglutition of the human throat.

Figure 1:
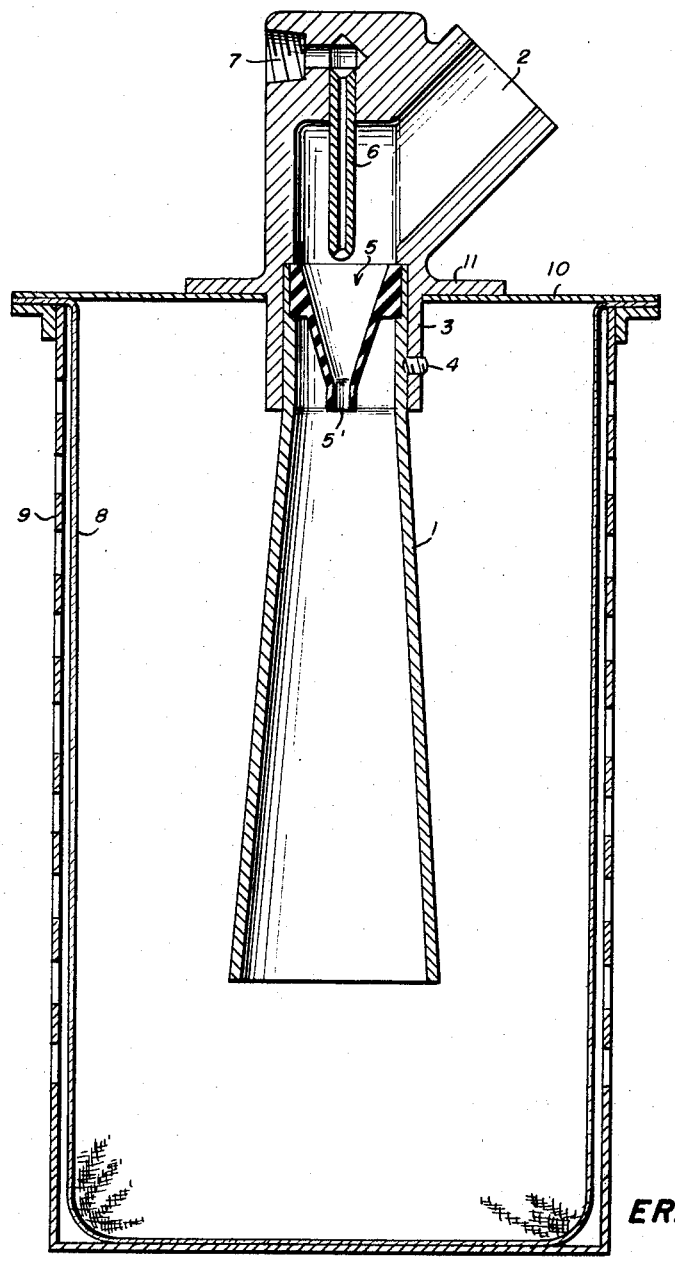
Figure 1 is a vertical half section of a dust particle collector showing the vacuum producer claimed.

The aspirator tube 1 called a venturi tube in the aforesaid pending application, communicates with suction chamber 2 through nozzle opening 3 and is held in place by set-screw 4. The upper end of aspirator tube 1 is chambered out to receive the tapered throat piece 5. Compressed air from orifice tube 6 which is supplied with air under pressure through pipe connection 7, discharges at high velocity into throat piece 5 and orifice 5' creating a powerful suction in vacuum chamber 2 to which can be attached a conduit for conveying dust laden air into chamber 2, thence through throat piece 5 and orifice 5' into tube 1 and finally into dust bag 8 which hangs in vented container 9. Suction chamber 2 is supported on cover 10 by flange 11.

The throat piece 5 and especially the integral tapered orifice tube 5', is made of yielding material such as live India rubber and is patterned after the human throat or the orifice of a gamopetalus flower, and can be made so yielding that it becomes collapsible.

Figure 4:
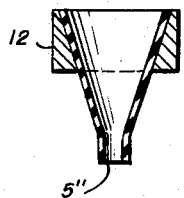
Fig. 4 is a vertical mid-section of a modified form of the throat piece of my invention.

The throat piece 5 can be constructed as shown in Figure 4 wherein the soft rubber orifice tube 5" is expanded into supporting ring 12 and cemented to it. This enables the throat orifice to be made of any durometer of rubber while the ring can be made of metal.

Experience has taught that a solid and unyielding throat in an aspirator tube tends to clog when large dust particles are conveyed and that a yielding throat piece similar to the human throat will pass large particles readily. When the dust particles tend to build up and clog the throat, the high velocity air stream from orifice tube 6 impinges on the mass of particles and forces the mass through the yielding throat piece. As soon as this mass passes through the yielding throat piece and the throat is cleared, the throat orifice 5' assumes its natural diameter and suction in chamber 2 is resumed and back flow of air and dust from dust bag 8 is restricted, the collapsible orifice tube 5' serving as a check valve. The smaller the orifice tube 5' and the higher the air velocity through it, the higher will be the vacuum produced. The orifice accommodates itself automatically to the air velocity, the volume of air and the volume of dust, much as the human throat accommodates the food that is swallowed.

These throat pieces can be made with very small orifices to produce high vacuum to convey heavy particles such as rivets, bolts and nuts which can be retained by a pre-cleaner connected with the vacuum chamber 2 thus preventing their entrance into the throat piece 5.

Figure 2:
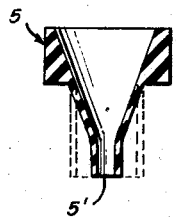
Figure 2 is a section of the throat piece hereinafter described, taken on line 2—2 of Figure 3.
Figure 3:
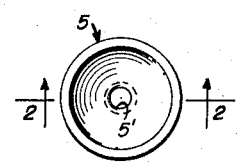
Fig. 3 is a top plan view of the throat piece of my invention.

The orifice tube 5' of throat piece 5 expands as shown by dotted lines in Figure 2. The high velocity air from orifice tube 6 serves the same function as the throat muscles in forcing the particles through the yielding throat orifice 5' similar to the act of deglutition.

I claim:

1. In vacuum producing device comprising a hollow housing having a first end with an opening therein, said opening having disposed thereacross a restrictive throat having a passage therethrough, said housing having an opening in the wall thereof, and a second end, and a projection extending from the wall of said housing at said opening in the wall, said projection having an opening therethrough in communication with the hollow interior of said housing, an orifice tube disposed within said housing, said second end having an opening communicating with said orifice tube, said orifice tube having an outlet directed toward the passage in said restrictive throat in said first end, whereby as fluid is passed in through said opening in said second end and through said orifice tube and out the said orifice tube in a stream toward the passage in said throat, a suction is created in the area in the housing adjacent said stream and in said opening in said projection, the improvement wherein said restrictive throat is of flexible material whereby the passage in said throat is adapted to enlarge to accommodate increased flow in said stream or passage of foreign matter.

2. A vacuum producing device as described in claim 1 wherein said throat has tapered walls tapered inwardly of the throat in a direction away from said housing.

3. A vacuum producing device as described in claim 1 wherein said throat is formed with a rigid outer peripheral ring having the flexible throat attached to and extending therefrom and said opening in said first end carries a peripheral recess, said ring being secured in said recess.

4. In a vacuum producing device comprising a substantially hollow cylindrical housing having a first end with an opening therein, said opening having disposed thereacross a restrictive throat having a passage therethrough, said housing having an opening in the wall thereof, and a second end and a substantially cylindrical projection extending from the cylindrical wall of said housing at said opening in the wall, said projection having an opening therethrough extending generally away from said first end and in communication with the hollow interior of said housing, an orifice tube disposed axially within said housing, said second end having an opening communicating with said orifice tube, said orifice tube having an outlet directed toward the passage in said restrictive throat in said first end, whereby as fluid is passed in through said opening in said second end and through said orifice tube and out the said orifice tube in a stream toward the passage in said throat, a suction is created in the area in the housing adjacent said stream and in said opening in said projection, the improvement wherein said restrictive throat comprises a rigid outer peripheral ring and said opening in said first end has a peripheral recess therearound, said ring being secured in said recess, a funnel-shaped flexible member, said ring having attached thereto the outer periphery of said funnel-shaped flexible member, said flexible member tapering inwardly of said ring for a distance in a direction away from said housing and terminating in a straight, non-tapered portion.

5. A vacuum producing and conveying device comprising a tube for conveying particles, said tube having an orifice or throat through which said particles pass, said throat being made of highly flexible material that will yield to the passage of particles larger than the normal diameter of the throat and then assume its normal diameter; a nozzle within said conveying tube for discharging a fluid at high velocity through said flexible throat thereby producing a flow of air through said conveying tube for conveying particles through said conveying tube and for forcing the particles through said expanding throat.

References Cited in the file of this patent

UNITED STATES PATENTS

| | | |
|---|---|---|
| 1,135,834 | Morton | Apr. 13, 1915 |
| 2,585,509 | Smith | Feb. 12, 1952 |
| 2,665,646 | Garrett | Jan. 12, 1954 |